US010756354B2

(12) United States Patent
Kishi et al.

(10) Patent No.: US 10,756,354 B2
(45) Date of Patent: Aug. 25, 2020

(54) MEMBRANE CATALYST LAYER ASSEMBLY PRODUCTION METHOD AND MEMBRANE CATALYST LAYER ASSEMBLY PRODUCTION DEVICE

(71) Applicant: Nissan Motor Co., Ltd., Yokohama-shi, Kanagawa (JP)

(72) Inventors: Michito Kishi, Kanagawa (JP); Tooru Kosemura, Kanagawa (JP); Takayuki Hirao, Kanagawa (JP); Hiroshi Miyaoka, Kanagawa (JP); Yasuhiro Numao, Kanagawa (JP); Jun Inomata, Kanagawa (JP); Kimio Nishimura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/755,610

(22) PCT Filed: Sep. 3, 2015

(86) PCT No.: PCT/JP2015/075129

§ 371 (c)(1),
(2) Date: Feb. 27, 2018

(87) PCT Pub. No.: WO2017/037929

PCT Pub. Date: Mar. 9, 2017

(65) Prior Publication Data

US 2019/0027760 A1 Jan. 24, 2019

(51) Int. Cl.
*H01M 4/88* (2006.01)
*H01M 4/86* (2006.01)
(Continued)

(52) U.S. Cl.
CPC ........... *H01M 4/881* (2013.01); *H01M 4/861* (2013.01); *H01M 4/8605* (2013.01); *H01M 4/88* (2013.01);
(Continued)

(58) Field of Classification Search
CPC .. H01M 4/881; H01M 4/8605; H01M 4/8828; H01M 4/8832; H01M 4/8882; H01M 4/92; H01M 2008/1095
See application file for complete search history.

(56) References Cited

U.S. PATENT DOCUMENTS

2002/0134501 A1* 9/2002 Fan .................... H01M 4/8807 156/308.2
2005/0163920 A1 7/2005 Yan et al.
(Continued)

FOREIGN PATENT DOCUMENTS

CN 103620840 A 3/2014
EP 2448048 A1 5/2012
(Continued)

*Primary Examiner* — Jonathan G Jelsma
(74) *Attorney, Agent, or Firm* — Global IP Counselors, LLP

(57) ABSTRACT

A membrane catalyst layer assembly production method is provided for producing a membrane catalyst layer assembly by discharging catalyst ink having a solvent and a solid component onto an electrolyte membrane. The membrane catalyst layer assembly production method includes forming a first catalyst ink layer having a first porosity on the electrolyte membrane by controlling a porosity of a catalyst ink layer that is formed by the catalyst ink making impact with the electrolyte membrane by adjusting an amount of solvent in the catalyst ink in drop form prior to impact with the electrolyte membrane, and forming a second catalyst ink layer having a second porosity, which is different from the first porosity, on the first catalyst ink layer, by adjusting the
(Continued)

amount of solvent in the catalyst ink in drop form prior to impact with the first catalyst ink layer.

18 Claims, 15 Drawing Sheets

(51) Int. Cl.

| | |
|---|---|
| ***H01M 8/1004*** | (2016.01) |
| ***H01M 8/02*** | (2016.01) |
| ***H01M 8/10*** | (2016.01) |
| ***H01M 8/1018*** | (2016.01) |

(52) U.S. Cl.

CPC ....... *H01M 4/8828* (2013.01); *H01M 4/8882* (2013.01); *H01M 8/02* (2013.01); *H01M 8/10* (2013.01); *H01M 8/1004* (2013.01); *H01M 8/1018* (2013.01); *H01M 2008/1095* (2013.01); *Y02P 70/56* (2015.11)

(56) References Cited

U.S. PATENT DOCUMENTS

| | | | | |
|---|---|---|---|---|
| 2006/0177572 | A1* | 8/2006 | Smith ................... | C23C 16/453 427/180 |
| 2008/0206616 | A1 | 8/2008 | Atanassova et al. | |
| 2009/0280377 | A1* | 11/2009 | Ueda ..................... | H01M 4/861 429/404 |
| 2013/0243943 | A1* | 9/2013 | Boulfrad ............. | H01M 4/8832 427/115 |
| 2013/0323434 | A1* | 12/2013 | Boulfrad .................... | B41J 3/28 427/555 |
| 2014/0120457 | A1 | 5/2014 | Choi et al. | |

FOREIGN PATENT DOCUMENTS

| | | | |
|---|---|---|---|
| GB | 2521677 | A | 7/2015 |
| JP | 10-189005 | A | 7/1998 |
| JP | 2003-173786 | A | 6/2003 |
| JP | 2003-211063 | A | 7/2003 |
| JP | 2004-47455 | A | 2/2004 |
| JP | 2004-179156 | A | 6/2004 |
| JP | 2004-186049 | A | 7/2004 |
| JP | 2004-273297 | A | 9/2004 |
| JP | 2005-116308 | A | 4/2005 |
| JP | 2005-267914 | A | 9/2005 |
| JP | 2005-267916 | A | 9/2005 |
| JP | 2006-173028 | A | 6/2006 |
| JP | 2006-216382 | A | 8/2006 |
| JP | 2007-179792 | A | 7/2007 |
| JP | 101663784 | A | 3/2010 |
| WO | 2012/169836 | A2 | 12/2012 |

* cited by examiner

MEMBRANE CATALYST LAYER ASSEMBLY PRODUCTION METHOD AND MEMBRANE CATALYST LAYER ASSEMBLY PRODUCTION DEVICE

CROSS-REFERENCE TO RELATED APPLICATIONS

This application is a U.S. National stage application of International Application No. PCT/JP2015/075129, filed Sep. 3, 2015.

BACKGROUND

Field of the Invention

The present invention relates to a membrane catalyst layer assembly production method, a membrane catalyst layer assembly production device, and a membrane catalyst layer assembly.

Background Information

In recent years, fuel cells have attracted attention as a power source with low environmental impact. A fuel cell is a clean power generation system in which the product of the electrode reaction is water in principle, having almost no adverse effect on the global environment. In particular, since it is possible to be operated at relatively low temperatures, polymer electrolyte fuel cells (PEFC) are anticipated as a power source for electric vehicles.

A polymer electrolyte fuel cell comprises a membrane catalyst layer assembly (CCM: Catalyst Coated Membrane) in which a catalyst layer is formed on an electrolyte membrane. A membrane electrode assembly (MEA: membrane electrode assembly) is configured by further comprising a gas diffusion layer in the membrane catalyst layer assembly.

In general, a method in which a catalyst layer is formed on an electrolyte membrane by coating catalyst ink containing a solid component and then drying the catalyst ink, is known as a method of manufacturing a membrane catalyst layer assembly.

The catalyst layer formed on the electrolyte membrane comprises a cathode side catalyst layer and an anode side catalyst layer. The cathode side catalyst layer is a catalyst layer in which a reductive reaction of oxygen progresses, and the anode side catalyst layer is a catalyst layer in which an oxidation reaction of hydrogen progresses.

In order to smoothly and continuously carry out the reductive reaction of oxygen that progresses in the cathode side catalyst layer, it is necessary to promptly eliminate water that is generated and to continuously supply oxygen gas.

In addition, in order to smoothly and continuously carry out the oxidation reaction of hydrogen that progresses in the anode side catalyst layer, it is necessary to continuously supply water and fuel gas for causing the generated hydrogen ions to smoothly diffuse in the electrolyte membrane by hydration.

From the foregoing, in order to smoothly carry out the reactions described above, it is required that a catalyst layer having the desired porosity be formed for the purpose of smoothly carrying out the supply of oxygen gas and fuel gas, and the supply and discharge of water.

In relation thereto, Japanese Laid-Open Patent Application No. 10-189005 (herein referred to as Patent Document 1) described below discloses a method in which a catalyst ink is prepared using a pore-forming agent, the catalyst ink is printed on an electrolyte membrane, and the pore-forming agent is eluted, to thereby produce an assembly of the electrode and the electrolyte membrane. Since pores that communicate in a three-dimensional manner are formed by a pore-forming agent having a three-dimensional structure according to the joined body produced by this production method, gas permeability is provided thereto.

In addition, Japanese Laid-Open Patent Application No. 2007-179792 (herein referred to as Patent Document 2) described below discloses a method of laminating a catalyst layer by repeatedly executing the inkjet method on an electrolyte layer. Since catalyst layer voids are formed in locations where the catalyst layer is not formed according to this lamination method, it is possible to provide a membrane catalyst layer assembly having gas permeability.

SUMMARY

In the production method disclosed in Patent Document 1, the distribution of pores formed inside the electrode depends on the distribution of the pore-forming agent. However, since it is difficult to adjust the distribution of the pore-forming agent so as to achieve the desired distribution, it is difficult to form a catalyst layer having the desired porosity on the electrolyte membrane.

In addition, in the method disclosed in Patent Document 2, a catalyst layer is formed by repeatedly executing the inkjet method, and catalyst layer voids through which gas is permeated are formed in locations where the catalyst layer is not formed. In this method, it is difficult for the catalyst layer itself to have the desired porosity.

The present invention was made to solve the problems described above. Therefore, an object of the present invention is to provide a method of producing a membrane catalyst layer assembly and a device for producing the membrane catalyst layer assembly, which are capable of producing a membrane catalyst layer assembly comprising a catalyst layer having the desired porosity.

Another object of the present invention is to provide a membrane catalyst layer assembly comprising a catalyst layer having different desired porosities in the lamination direction.

The membrane catalyst layer assembly production method according to the present invention which achieves the objects described above is a membrane catalyst layer assembly production method for producing a membrane catalyst layer assembly by discharging catalyst ink comprising a solvent and a solid component onto an electrolyte membrane. In the membrane catalyst layer assembly production method, a porosity of the catalyst ink layer that is formed by the catalyst ink making impact with the electrolyte membrane is controlled by adjusting the amount of solvent in the catalyst ink in drop form prior to impact with the electrolyte membrane.

In addition, the membrane catalyst layer assembly production device according to the present invention which achieves the objects described above is a membrane catalyst layer assembly production device for producing a membrane catalyst layer assembly by discharging a catalyst ink comprising a solvent and a solid component onto an electrolyte membrane. The production device comprises an adjustment unit that controls the porosity of a catalyst ink layer that is formed by the catalyst ink making impact with the electrolyte membrane, by adjusting the amount of solvent in the catalyst ink in drop form prior to impact with the electrolyte membrane.

In addition, the membrane catalyst layer assembly according to the present invention which achieves the objects described above is a membrane catalyst layer assembly in which a cathode side catalyst layer is formed on one surface of an electrolyte membrane for a fuel cell, and an anode side catalyst layer is formed on the other surface of the electrolyte membrane. At least one catalyst layer from among the cathode side catalyst layer and the anode side catalyst layer is formed by laminating a plurality of layers having mutually different porosities.

According to the method and device for producing a membrane catalyst layer assembly described above, the amount of solvent in the catalyst ink prior to impact with the electrolyte membrane is adjusted. If the amount of solvent in the catalyst ink prior to impact with the electrolyte membrane is adjusted to be relatively large, the volume of the catalyst ink in drop form at the time of impact becomes relatively large. As a result, adjacent droplets of the catalyst ink are bound to each other, and the voids between adjacent droplets of the catalyst ink become relatively small. Therefore, the porosity of the catalyst ink layer formed by droplets of the catalyst ink making impact with the electrolyte membrane becomes relatively low. Accordingly, the porosity of the catalyst layer, formed by the catalyst ink layer being dried, can be made relatively low. On the other hand, if the amount of solvent in the catalyst ink prior to impact with the electrolyte membrane is adjusted to be relatively small, the volume of the droplets of the catalyst ink at the time of impact becomes relatively small. As a result, adjacent droplets of the catalyst ink are not bound to each other, and the voids between droplets of the catalyst ink become relatively large. Therefore, the porosity of the catalyst ink layer formed by droplets of the catalyst ink making impact with the electrolyte membrane becomes relatively high. Accordingly, the porosity of the catalyst layer, formed by the catalyst ink layer being dried, can be made relatively high. As described above, it is possible to appropriately set the porosity of the catalyst layer to the desired porosity by adjusting the amount of solvent in the catalyst ink prior to impact with the electrolyte membrane. Therefore, it is possible to provide a method of producing a membrane catalyst layer assembly and a device for producing the membrane catalyst layer assembly which are capable of forming a catalyst layer having the desired porosity.

In addition, according to the membrane catalyst layer assembly described above, it is possible to provide a membrane catalyst layer assembly comprising a catalyst layer having different desired porosities in the lamination direction.

DETAILED DESCRIPTION OF THE EMBODIMENTS

Embodiments of the present invention will be explained below, with reference to the appended drawings. In the explanations of the drawings, the same elements have been assigned the same reference symbols, and redundant explanations have been omitted. Dimensional ratios of the drawings are exaggerated for the sake of clarity of the explanation and may differ from the actual ratio.

First Embodiment

Figure 1:
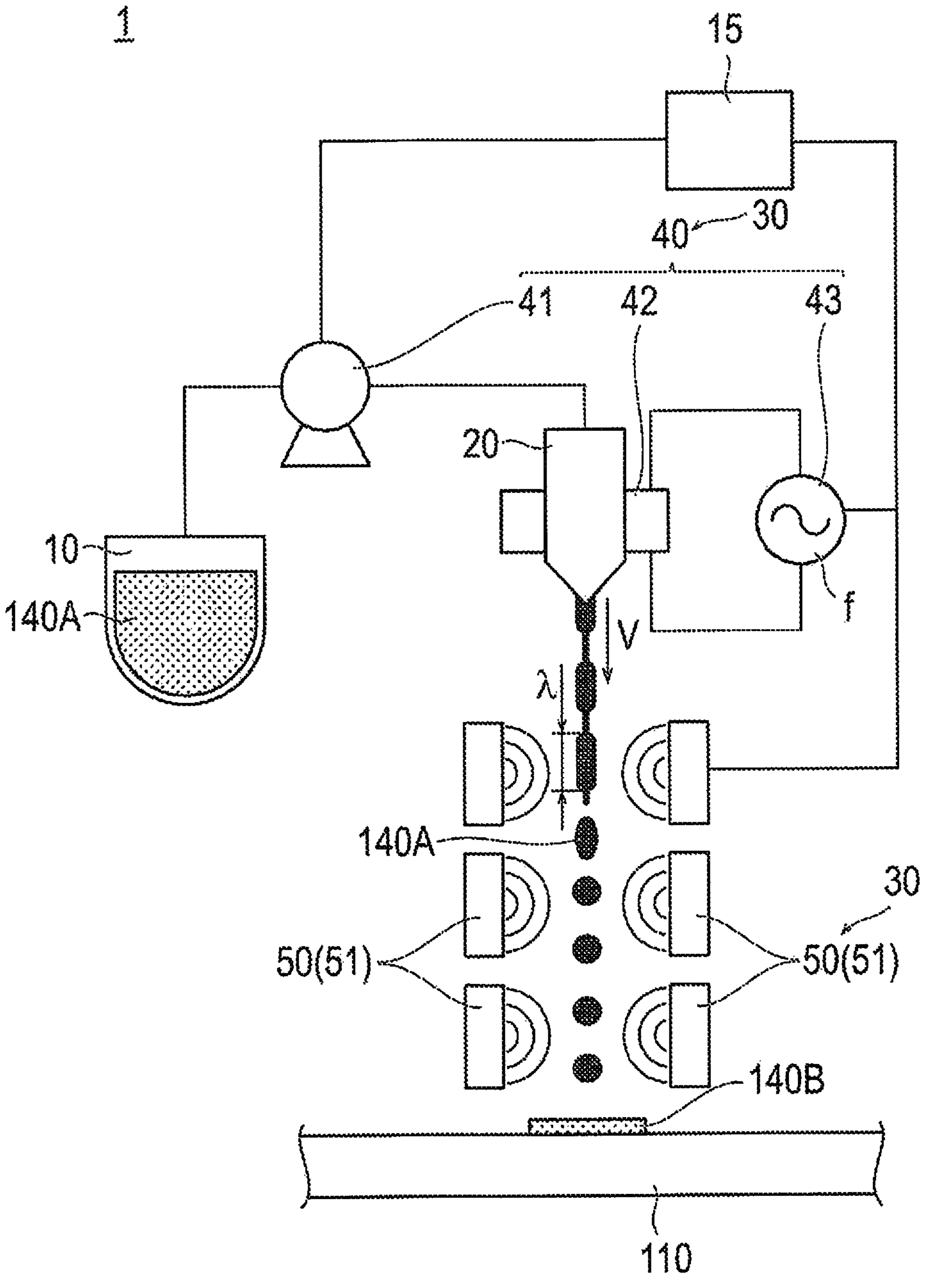
FIG. 1 is a schematic view illustrating the membrane catalyst layer assembly production device according to a first embodiment.
Figure 2:
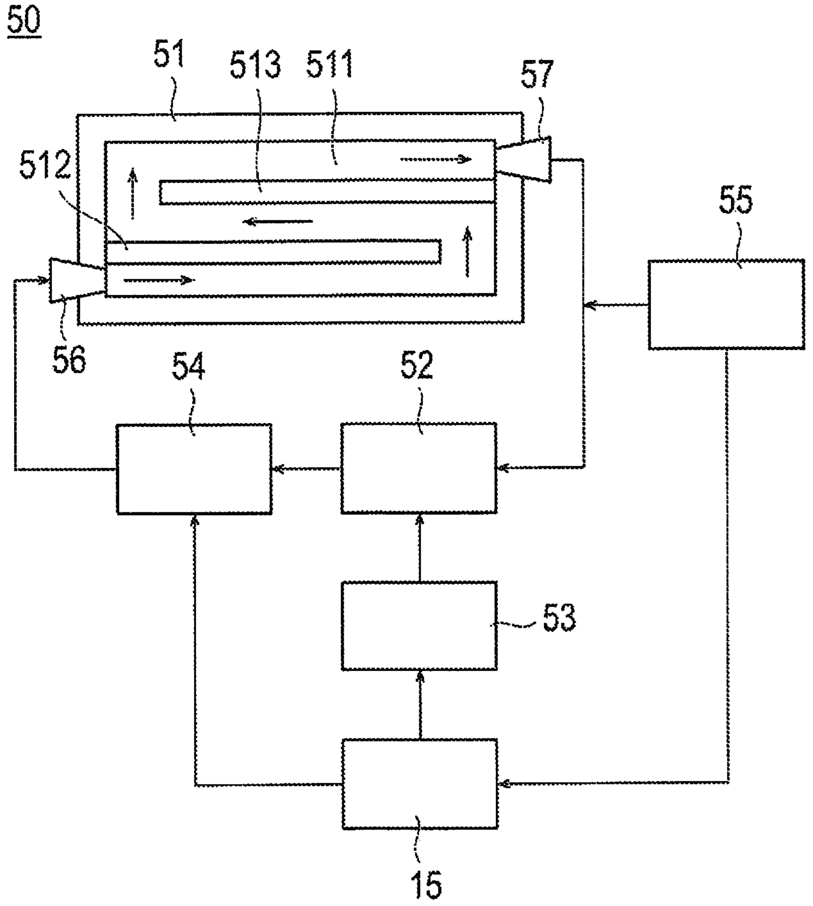
FIG. 2 is a view illustrating a concentration adjustment unit according to the first embodiment.

First, the membrane catalyst layer assembly production device 1 and production method according to the first embodiment will be described. FIG. 1 is a schematic view illustrating the membrane catalyst layer assembly production device 1 according to the first embodiment. FIG. 2 is a view illustrating a concentration adjustment unit 50 according to the first embodiment. In the following description, there are cases in which the anode side catalyst layer and the cathode side catalyst layer are collectively referred to as the catalyst layer.

First, the membrane catalyst layer assembly production device 1 according to the first embodiment will be described with reference to FIGS. 1 and 2.

The membrane catalyst layer assembly production device 1 comprises an ink tank 10 in which catalyst ink 140A is stored and an ejection unit 20 that ejects the catalyst ink 140A directed onto an electrolyte membrane 110 in dropwise fashion, as illustrated in FIG. 1. In addition, the membrane catalyst layer assembly production device 1 comprises an adjustment unit 30 for adjusting the amount of solvent in the catalyst ink 140A in drop form prior to impact with the electrolyte membrane 110. Additionally, the membrane catalyst layer assembly production device 1 comprises a control unit 15 for controlling the various operations of the adjustment unit 30.

The catalyst ink 140A is stored in the ink tank 10. The composition of the catalyst ink 140A will be described below.

The catalyst ink 140A contains a solvent, an ionomer, and catalyst particles. In addition to the above, the catalyst ink 140A may contain additives such as a water-repellent agent, a dispersant, a thickener, a pore-forming agent, and the like. The catalyst ink 140A is stirred in the ink tank 10. In the following description, the ratio of the mass of the ionomer and the catalyst particles with respect to the total mass of the catalyst ink 140A is defined as the "solid content concentration of the catalyst ink."

The solvent may be water, such as tap water, pure water, ion exchanged water, and distilled water, a lower alcohol with a carbon number of 1-4, such as cyclohexanol, methanol, ethanol, n-propanol (n-propyl alcohol), isopropanol, n-butanol, sec-butanol, isobutanol, and tert-butanol, propylene glycol, benzene, toluene, and xylene, but is not limited thereto. Other than the foregoing, butyl acetate alcohol, dimethyl ether, ethylene glycol, etc. may be used as the solvent. One type of these solvents may be used alone, or two or more types may be used in a mixed solution state.

Examples of the ionomer include a fluorine-based polymer electrolyte material and a hydrocarbon-based polymer electrolyte material, but are not limited thereto. Examples of the fluorine-based polymer electrolyte material include perfluorocarbon sulfonic acid-based polymers such as Nafion (registered trademark), Aciplex (registered trademark), Flemion (registered trademark), perfluorocarbon phosphonic acid-based polymers, trifluorostyrene sulfonic acid-based polymers, ethylene tetrafluoroethylene-g-styrene sulfonic acid-based polymers, ethylene tetrafluoroethylene copolymers, and polyvinylidene fluoride perfluorocarbon sulfonic acid-based polymers. Examples of the hydrocarbon-based polymer electrolyte material include sulfonated polyether sulfone (S-PES), sulfonated polyaryletherketone, sulfonated polybenzimidazole alkyl, phosphonated polybenzimidazole alkyl, sulfonated polystyrene, sulfonated polyether ether ketone (SPEEK), and sulfonated polyphenylene (S-PP).

The catalyst particles comprise at least a substance having a catalytic action, and has, for example, a catalyst metal having a catalytic action and a catalyst carrier that supports the catalytic metal.

The catalytic metal is, for example, a platinum-containing catalytic metal, but no limitation is imposed thereby. Examples of the platinum-containing catalytic metal include platinum (Pt) single particles, or a mixture of platinum particles and at least one type of another metal particle selected from a group comprising ruthenium (Ru), iridium (Ir), rhodium (Rh), palladium (Pd), osmium (Os), tungsten (W), lead (Pb), iron (Fe), chromium (Cr), cobalt (Co), nickel (Ni), manganese (Mn), vanadium (V), molybdenum (Mo), gallium (Ga), and aluminum (Al), and an alloy of platinum and another metal.

The catalyst carrier, for example, has electron conductivity, and is mainly composed of carbon. Examples of the catalyst carried include carbon particles composed of carbon black (Ketjenblack, Oil Furnace Black, Channel Black, Lamp Black, Thermal Black, Acetylene Black, etc.), activated carbon, and the like, but no limitation is imposed thereby.

The ejection unit 20 ejects the catalyst ink 140A directed onto the electrolyte membrane 110. The ejection unit 20 is, for example, an inkjet type nozzle.

The adjustment unit 30 controls the porosity of a catalyst ink layer 140B that is formed by the catalyst ink 140A making impact with the electrolyte membrane 110 by adjusting the amount of solvent in the catalyst ink 140A in drop form prior to impact with the electrolyte membrane 110. Here, the catalyst ink layer 140B means a layer formed when a plurality of droplets of the catalyst ink 140A make impact with the electrolyte membrane 110. A catalyst layer 140 is formed by drying this catalyst ink layer 140B and evaporating the solvent component. In addition, the porosity of the catalyst ink layer 140B means the ratio of the volume occupied by the voids with respect to the total volume of the catalyst ink layer 140B.

The adjustment unit 30 includes a volume adjustment unit 40 for changing the droplet volume of the catalyst ink 140A and a concentration adjustment unit 50 for changing the solid content concentration of the catalyst ink 140A by drying the catalyst ink 140A while airborne.

The volume adjustment unit 40 adjusts the amount of solvent in the catalyst ink 140A by adjusting the frequency and the flow rate at the time of discharge of the catalyst ink 140A to change the droplet volume of the catalyst ink 140A.

The volume adjustment unit 40 comprises a pump 41 that is capable of adjusting the flow rate at the time of discharge of the catalyst ink 140A, an oscillator 42 that is capable of adjusting the frequency at the time of discharge of the catalyst ink 140A, and an excitation source 43. The oscillator 42 is fixed to the ejection unit 20, and the ejection unit 20 is vibrated at the same frequency as the frequency of the oscillator 42 by an excitation source 43 vibrating the oscillator 42. The mechanism by which the catalyst ink 140A is discharged from the ejection unit 20 in dropwise fashion will be described below.

The catalyst ink 140A is injected from the ejection unit 20 by a predetermined pressure being applied from the pump 41 to the ejection unit 20, and the catalyst ink 140A is formed into a liquid column. Then, by the excitation source 43 vibrating the oscillator 42, a constriction and a break is generated in the catalyst ink 140A that is formed into a liquid column, whereby the catalyst ink 140A is formed into drops.

Next, the mechanism by which the volume of the droplet of the catalyst ink 140A is adjusted by the volume adjustment unit 40 will be described.

The wavelength immediately before a droplet of the catalyst ink 140A discharged from the ejection unit 20 is formed shall be $\lambda$, the flow rate at the time of discharge of the catalyst ink 140A shall be V, and the frequency at the time of discharge of the catalyst ink 140A shall be f. The frequency fat the time of ejection of the catalyst ink 140A is the same as the frequency fat which the excitation source 43 vibrates the oscillator 42. At this time, the wavelength $\lambda$ is proportional to the flow rate V and inversely proportional to the frequency f. The droplet volume of the catalyst ink 140A formed into drops increases as the wavelength $\lambda$ increases, and the droplet volume of the catalyst ink 140A decreases as the wavelength $\lambda$ decreases. In addition, the flow rate V increases as the pressure applied by the pump 41 to the ejection unit 20 increases.

From the foregoing, the droplet volume of the catalyst ink 140A increases as the pressure of the pump 41 is increased, and the frequency fat which the excitation source 43 vibrates the oscillator 42 is decreased. On the other hand, the droplet volume of the catalyst ink 140A decreases as the pressure of the pump 41 is decreased and the frequency fat which the excitation source 43 vibrates the oscillator 42 is increased.

In addition, as described above, adjacent droplets of the catalyst ink 140A are bound to each other, and the voids between adjacent droplets of the catalyst ink 140A become relatively small, by adjusting the amount of solvent in the catalyst ink 140A such that the droplet volume of the catalyst ink 140A becomes relatively large. Therefore, the porosity of the catalyst ink layer 140B formed by droplets of the catalyst ink 140A making impact with the electrolyte membrane 110 becomes relatively low.

In addition, adjacent droplets of the catalyst ink 140A are not bound to each other, and the voids between adjacent droplets of the catalyst ink 140A become relatively large by adjusting the amount of solvent in the catalyst ink 140A such that the droplet volume of the catalyst ink 140A becomes relatively small. Therefore, the porosity of the catalyst ink layer 140B formed by droplets of the catalyst ink 140A making impact with the electrolyte membrane 110 becomes relatively high.

The concentration adjustment unit 50 adjusts the amount of solvent in the catalyst ink 140A by applying heat to the catalyst ink 140A while airborne to dry the catalyst ink 140A. The solid content concentration of the catalyst ink 140A is thereby changed.

The concentration adjustment unit 50 comprises a drying promoting plate 51, a tank 52 in which water is stored, a heater 53 that provides heat to the water in the tank 52, and a supply pump 54 that supplies the water in the tank 52 in the drying promoting plate 51, as illustrated in FIG. 2. In addition, the concentration adjustment unit 50 comprises a thermometer 55 that measures the temperature of the water upon returning to the tank 52 after circulating inside the drying promoting plate 51. The operations of the heater 53 and the supply pump 54 are controlled by the control unit 15. In addition, the temperature data of the water measured by the thermometer 55 are transmitted to the control unit 15.

The drying promoting plate 51 is disposed on the outer perimeter of the dripping direction (vertical direction in FIG. 1) in which the catalyst ink 140A is dripped dropwise, as illustrated in FIGS. 1 and 2.

Two plate members 512, 513 are disposed inside the drying promoting plate 51, as illustrated in FIG. 2. The two plate members 512, 513 extend from mutually opposing side surfaces, and are disposed to as to form gaps at the forward advance limits in the extension direction. The two plate members 512, 513 having such a configuration are disposed inside the drying promoting plate 51 to thereby form a circulation path 511 having a predetermined distance and in which hot water can be circulated inside the drying promoting plate 51 (refer to the arrows in FIG. 2).

In addition, the drying promoting plate 51 is provided with a hot water inlet 56 that supplies hot water from the tank 52 to the circulation path 511 in the drying promoting plate 51, and a hot water outlet 57 from which the hot water that has circulated through the circulation path 511 is discharged from the inside of the drying promoting plate 51.

According to a concentration adjustment unit 50 configured in this manner, the hot water in the tank 52 heated by the heater 53 is supplied to the drying promoting plate 51 by the supply pump 54 via the hot water inlet 56, and circulates through the circulation path 511. The ambient temperature of the drying promoting plate 51 is thereby raised, and the catalyst ink 140A is dried while airborne. The hot water that has circulated through the circulation path 511 is then returned to the tank 52 again via the hot water outlet 57. The temperature of the hot water when returning to the inside of the tank 52 is measured by the thermometer 55, and the control unit 15 controls the temperature of the heater 53 based on the temperature data.

Next, the mechanism by which the concentration adjustment unit 50 controls the porosity of the catalyst ink layer 140B that is formed by the catalyst ink 140A making impact with the electrolyte membrane 110, by adjusting the amount of solvent in the catalyst ink 140A, will be described.

In the concentration adjustment unit 50, a relatively small amount of heat is applied to the catalyst ink 140A while airborne to thereby adjust the amount of solvent in the catalyst ink 140A such that a decrease in the amount of solvent in the airborne catalyst ink 140A is suppressed. As a result, the volume of the droplets of the catalyst ink 140A at the time of impact becomes relatively large. Therefore, adjacent droplets of the catalyst ink 140A are bound to each other, and the voids between adjacent droplets of the catalyst ink 140A become relatively small. Therefore, the porosity of the catalyst ink layer 140B formed by droplets of the catalyst ink 140A making impact with the electrolyte membrane 110 becomes relatively low.

On the other hand, in the concentration adjustment unit 50, a relatively large amount of heat is applied to the catalyst ink 140A while airborne, to thereby adjust the amount of solvent in the catalyst ink 140A such that a decrease in the amount of solvent in the airborne catalyst ink 140A is promoted. As a result, the volume of the droplets of the catalyst ink 140A at the time of impact becomes relatively small. Therefore, adjacent droplets of the catalyst ink 140A are not bound to each other, and the voids between adjacent droplets of the catalyst ink 140A become relatively large. Therefore, the porosity of the catalyst ink layer 140B formed by droplets of the catalyst ink 140A making impact with the electrolyte membrane 110 becomes relatively high.

Figure 3:
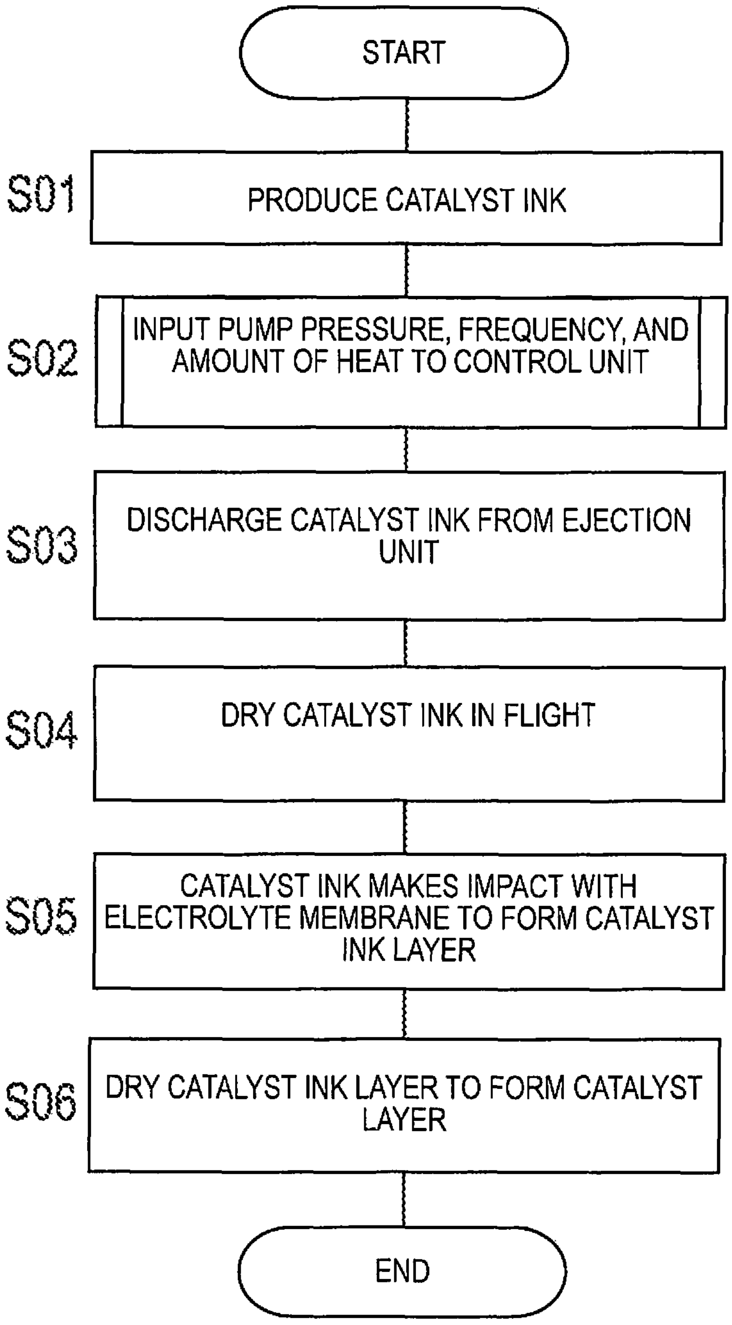
FIG. 3 is a flowchart illustrating the membrane catalyst layer assembly production method according to the first embodiment.
Figure 4:
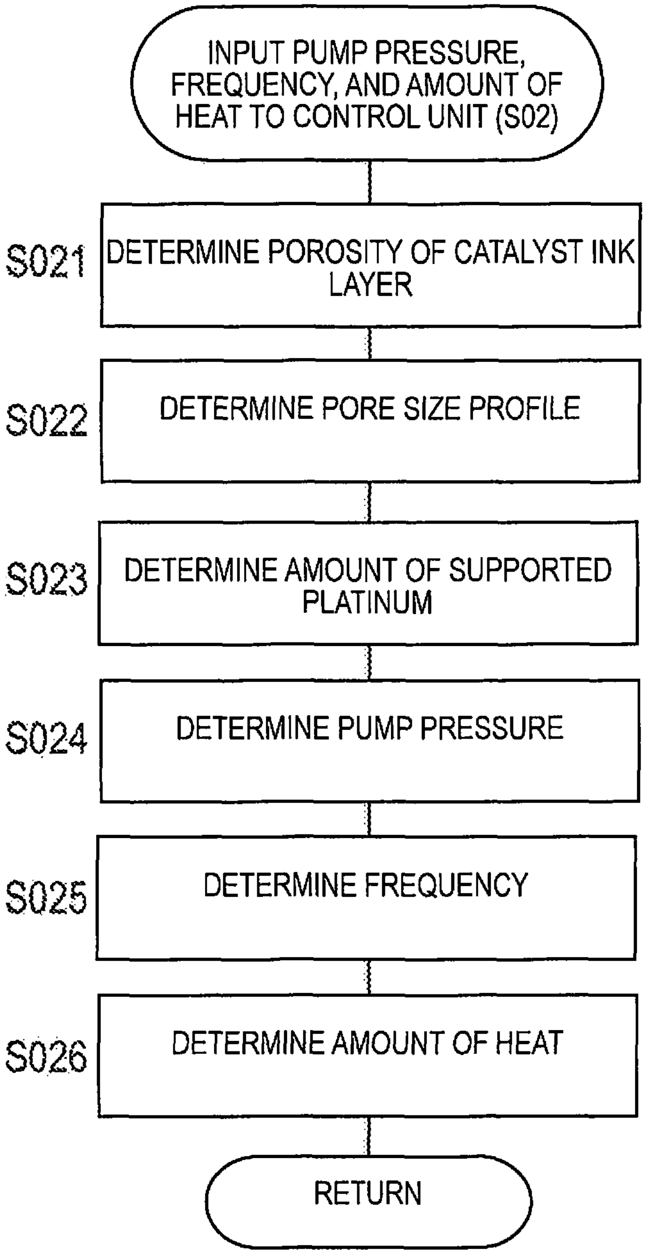
FIG. 4 is a flowchart illustrating Step S02 of the membrane catalyst layer assembly production method.
Figure 5:
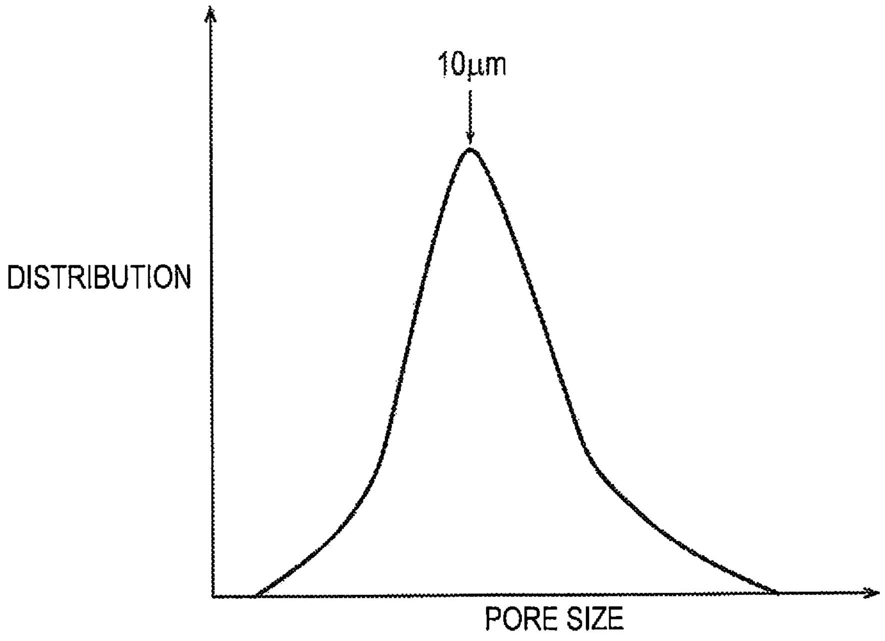
FIG. 5 is a graph illustrating one example of a pore size profile in the catalyst ink layer.

Next, the membrane catalyst layer assembly production method will be described with reference to FIGS. 3-5. FIG. 3 is a flowchart illustrating the membrane catalyst layer assembly production method according to the first embodiment. FIG. 4 is a flowchart illustrating Step S02 of the membrane catalyst layer assembly production method. FIG. 5 is a graph illustrating one example of a pore size profile in the catalyst ink layer 140B.

First, catalyst ink 140A is produced (S01). The method of producing the catalyst ink 140A is not particularly limited, as long as an electrode catalyst, an electrolyte, a solvent, and, if needed, a water repellent polymer and/or a thickener, are appropriately mixed therein. For example, an electrolyte is added to a polar solvent, and the mixed solution is heated and stirred to dissolve the electrolyte in the polar solvent, after which an electrode catalyst is added thereto, to produce the catalyst ink 140A. Alternatively, an electrolyte is temporarily dispersed/suspended in a solvent, after which this dispersion/suspension liquid is mixed with an electrode catalyst, to produce the catalyst ink 140A.

Next, the pressure of the pump 41 applied to the ejection unit 20, the frequency fat the time of ejection of the catalyst ink 140A, and the amount of heat supplied by the concentration adjustment unit 50 to the catalyst ink 140A while airborne, are determined (S02). Step 02 will be described in detail below with reference to FIG. 4.

First, the porosity of the catalyst ink layer 140B formed by the catalyst ink 140A making impact with the electrolyte membrane 110 is determined (S021). The porosity of the catalyst ink layer 140B is determined such that the catalyst layer formed by drying has the desired porosity.

Next, the pore size profile in the catalyst ink layer 140B is determined from the porosity of the catalyst ink layer 140B determined in Step S021 (S022). Here, the pore size is the representative diameter of the voids in the catalyst ink layer 140B. For example, a profile in which the peak pore size is 10 μm may be selected as the pore size profile, as illustrated in FIG. 5.

Next, the amount of supported platinum is determined (S023). The amount of supported platinum is determined in consideration of the catalyst activity.

Next, the pressure of the pump 41 is determined (S024). Specifically, the pressure of the pump 41 is determined such that the catalyst ink layer 140B has the amount of supported platinum determined in Step S023. The flow rate V of the catalyst ink 140A at the time of ejection is determined according to the determined value of the pressure of the pump 41.

Next, the frequency fat the time of ejection of the catalyst ink 140A is determined (S025). Specifically, the frequency f is determined such that the pore size profile determined in Step S022 is realized.

Next, the amount of heat supplied to the catalyst ink 140A in the concentration adjustment unit 50 will be described (S026) Specifically, the amount of heat is determined such that the catalyst ink 140A when making impact with the electrolyte membrane 110 has the desired solid content concentration.

The pressure of the pump 41 applied to the ejection unit 20, the frequency fat the time of ejection of the catalyst ink 140A, and the amount of heat supplied by the concentration adjustment unit 50 to the catalyst ink 140A are determined according to the steps S021-S026 described above.

Next, with reference again to FIG. 3, the catalyst ink 140A is discharged from the ejection unit 20 (S03). The catalyst ink 140A is discharged based on the pressure of the pump 41 determined in Step S02 and the frequency fat the time of discharge.

Next, the catalyst ink 140A is dried while airborne (S04). Specifically, hot water is circulated inside the drying promoting plate 51 of the concentration adjustment unit 50 to raise the ambient temperature of the drying promoting plate 51. The amount of heat determined in Step S02 is thereby applied to the catalyst ink 140A to dry the catalyst ink 140A. As a result, the solid content concentration of the catalyst ink 140A is changed.

Next, the catalyst ink 140A makes impact with the electrolyte membrane 110 to form the catalyst ink layer 140B (S05). As a result, a catalyst ink layer 140B having the porosity determined in Step S021 is formed.

Next, the catalyst ink layer 140B is dried to form the catalyst layer 140 (S06). The drying method is not particularly limited.

The membrane catalyst layer assembly 100 is produced by the steps described above.

Figure 6B:
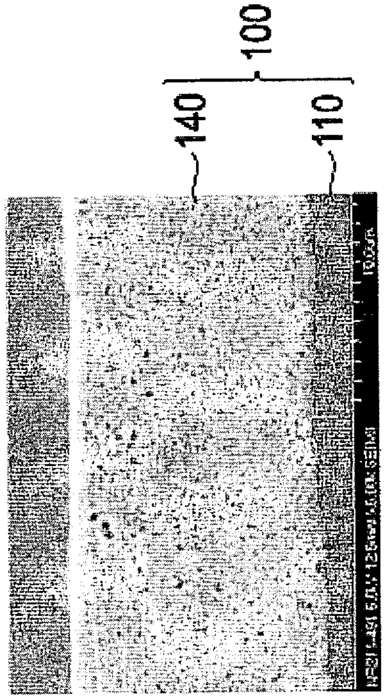
FIG. 6B is an SEM micrograph illustrating the catalyst layer when the porosity is low.
Figure 6A:
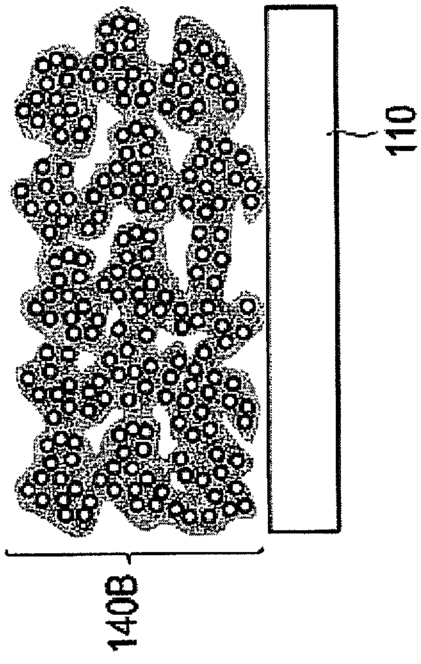
FIG. 6A is a schematic view illustrating the catalyst ink layer when the porosity is low.
Figure 7A:
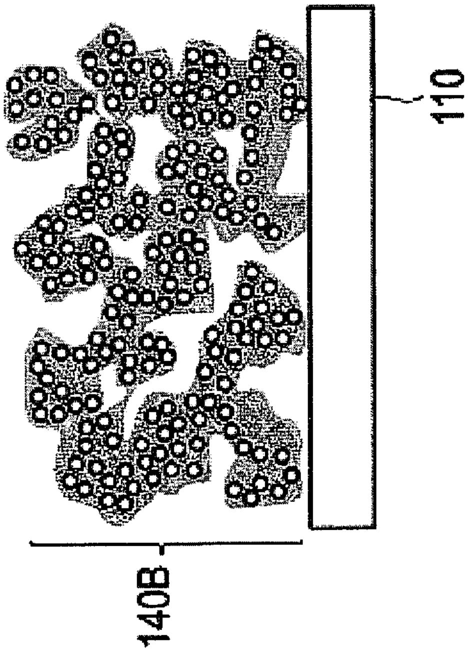
FIG. 7A is a schematic view illustrating the catalyst ink layer when the porosity is high.
Figure 7B:
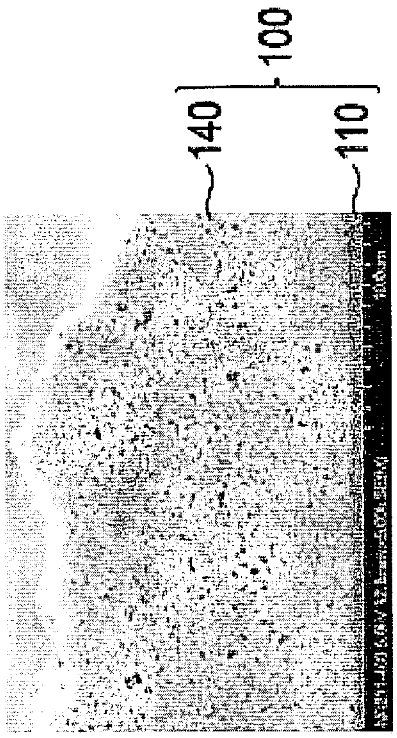
FIG. 7B is an SEM micrograph illustrating the catalyst layer when the porosity is high.

Next, the configurations of the catalyst ink layer 140B prior to the start of Step S06 and of the catalyst layer 140 at the end of Step S06 will be described with reference to FIGS. 6 and 7. FIG. 6A is a schematic view illustrating the catalyst ink layer 140B when the porosity is low, and FIG. 6B is an SEM micrograph illustrating the catalyst layer 140 when the porosity is low. FIG. 7A is a schematic view illustrating the catalyst ink layer 140B when the porosity is high, and FIG. 7B is an SEM micrograph illustrating the catalyst layer 140 when the porosity is high.

In the volume adjustment unit 40, the droplet volume of the catalyst ink 140A becomes relatively large by increasing the pressure of the pump 41 and decreasing the frequency f of the oscillator 42. In addition, the drying of the airborne catalyst ink 140A is suppressed by reducing the relative amount of heat applied to the catalyst ink 140A while airborne in the concentration adjustment unit 50. When the amount of solvent in the catalyst ink 140A is adjusted to be relatively large in this manner, the porosity of the catalyst ink layer 140B becomes low, as illustrated in FIG. 6A. Then, a membrane catalyst layer assembly 100 comprising a catalyst layer 140 having a low porosity is formed by drying the catalyst ink layer 140B having a low porosity, as illustrated in FIG. 6B.

On the other hand, in the volume adjustment unit 40, the droplet volume of the catalyst ink 140A becomes relatively small by decreasing the pressure of the pump 41 and increasing the frequency f of the oscillator 42. In addition, the drying of the airborne catalyst ink 140A is promoted by increasing the relative amount of heat applied to the catalyst ink 140A while airborne in the concentration adjustment unit 50. When the amount of solvent in the catalyst ink 140A is adjusted to be relatively small in this manner, the porosity of the catalyst ink layer 140B becomes high, as illustrated in FIG. 7A. Then, a membrane catalyst layer assembly 100 comprising a catalyst layer 140 having a high porosity is formed by drying the catalyst ink layer 140B having a high porosity, as illustrated in FIG. 7B.

In this manner, it is possible to control the porosity of the catalyst layer 140 and the catalyst ink layer 140B that is formed by the catalyst ink 140A making impact with the electrolyte membrane 110 by adjusting the amount of solvent in the catalyst ink 140A in drop form prior to impact with the electrolyte membrane 110.

As described above, according to the method and device 1 for producing a membrane catalyst layer assembly 100 according to the first embodiment, the amount of solvent in the catalyst ink 140A prior to impact with the electrolyte membrane 110 is adjusted. If the amount of solvent in the catalyst ink 140A prior to impact with the electrolyte membrane 110 is adjusted to be relatively large, the volume of the catalyst ink 140A in drop form at the time of impact becomes relatively large. As a result, adjacent droplets of the catalyst ink 140A are bound to each other, and the voids between adjacent droplets of the catalyst ink 140A become relatively small. Therefore, the porosity of the catalyst ink layer 140B formed by droplets of the catalyst ink 140A making impact with the electrolyte membrane 110 becomes relatively low. Accordingly, the porosity of the catalyst layer 140, formed by the catalyst ink layer 140B being dried, can be made relatively low. On the other hand, if the amount of solvent in the catalyst ink 140A prior to impact with the electrolyte membrane 110 is adjusted to be relatively small, the volume of the droplets of the catalyst ink 140A at the time of impact becomes relatively small. As a result, adjacent droplets of the catalyst ink 140A are not bound to each other, and the voids between adjacent droplets of the catalyst ink 140A become relatively large. Therefore, the porosity of the catalyst ink layer 140B formed by droplets of the catalyst ink 140A making impact with the electrolyte membrane 110 becomes relatively high. Thus, the porosity of the catalyst layer 140, formed by the catalyst ink layer 140B being dried, can be made relatively high. As described above, it is possible to set the porosity of the catalyst layer 140 appropriately to the desired porosity by adjusting the amount of solvent in the catalyst ink 140A prior to impact with the electrolyte membrane 110. Therefore, it is possible to provide a method of producing a membrane catalyst layer assembly 100 and a device 1 for producing the membrane catalyst layer assembly 100, which are capable of forming a catalyst layer 140 having the desired porosity.

In addition, the solid content concentration of the catalyst ink 140A is changed by adjusting the amount of solvent in the catalyst ink 140A by drying the catalyst ink 140A while airborne. Accordingly, it is possible to easily control the porosity of the catalyst ink layer 140B.

In addition, the catalyst ink 140A is dried by applying heat to the catalyst ink 140A while airborne. Accordingly, it is possible to more easily control the porosity of the catalyst ink layer 140B.

Additionally, the catalyst ink 140A is discharged by an inkjet method, and the droplet volume of the catalyst ink 140A is changed by adjusting the frequency f and the flow rate V at the time of discharge of the catalyst ink 140A. The amount of solvent in the catalyst ink 140A is then adjusted by changing the droplet volume. It is therefore possible to more reliably control the porosity of the catalyst ink layer 140B.

Modified examples 1-3 of the concentration adjustment unit 50 according to the first embodiment will now be described.

Modified Example 1

Figure 8:
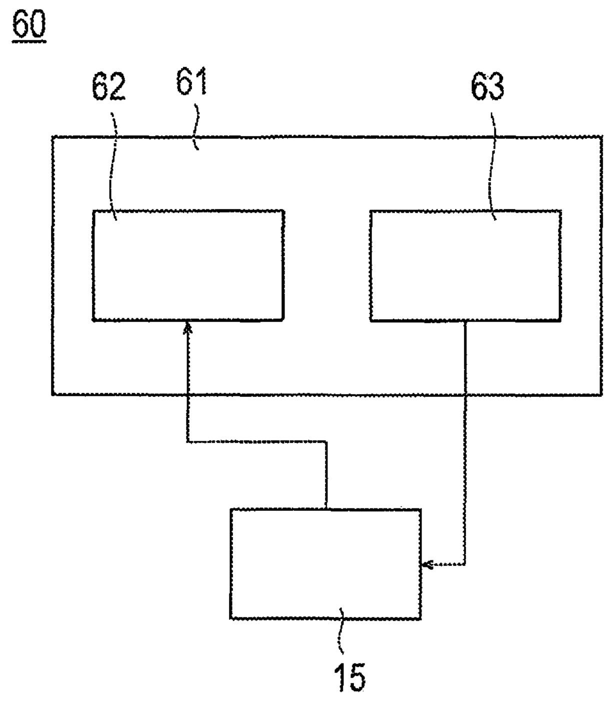
FIG. 8 is a view illustrating a concentration adjustment unit according to Modified Example 1.

The configuration of the concentration adjustment unit 60 according to Modified Example 1 will be described with reference to FIG. 8. FIG. 8 is a view illustrating the concentration adjustment unit 60 according to Modified Example 1.

The concentration adjustment unit 60 according to Modified Example 1 dries the catalyst ink 140A by applying heat to the catalyst ink 140A while airborne in the same manner as the concentration adjustment unit 50 according to the first embodiment. The amount of solvent in the catalyst ink 140A is then adjusted and the porosity of the catalyst ink layer 140B is controlled by drying the catalyst ink 140A.

The concentration adjustment unit 60 comprises a drying promoting plate 61, and a heater 62 and a thermometer 63 disposed inside the drying promoting plate 61, as illustrated in FIG. 8.

The drying promoting plate 61 is disposed on the outer perimeter of the dripping direction in which the catalyst ink 140A is dripped dropwise in the same manner as the drying promoting plate 51 according to the first embodiment (refer to FIG. 1).

According to the concentration adjustment unit 60 configured in this manner, the ambient temperature of the drying promoting plate 61 is raised, and the airborne catalyst ink 140A is dried by the heater 62. The temperature of the drying promoting plate 61 is measured by the thermometer 63, and the control unit 15 controls the temperature of the heater 62 based on these temperature data.

Modified Example 2

Figure 9:
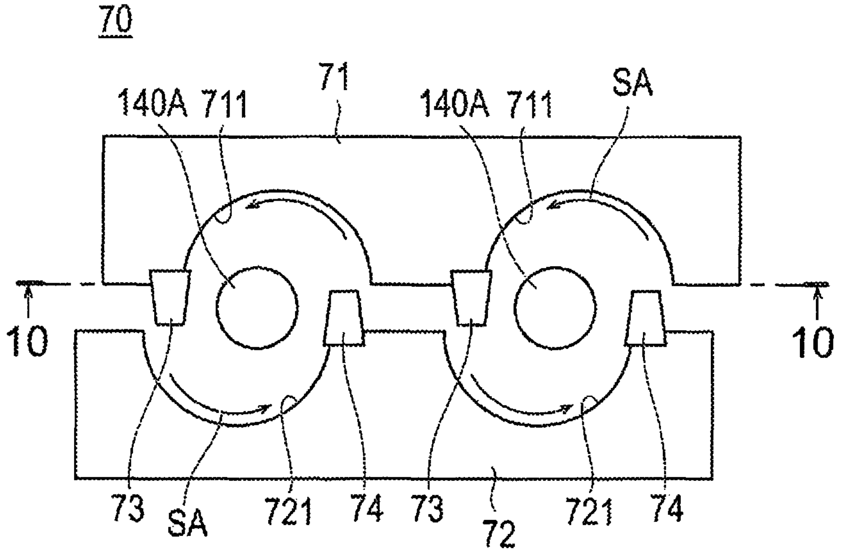
FIG. 9 is a view illustrating a concentration adjustment unit according to Modified Example 2 as viewed from the dripping direction of the catalyst ink.
Figure 10:
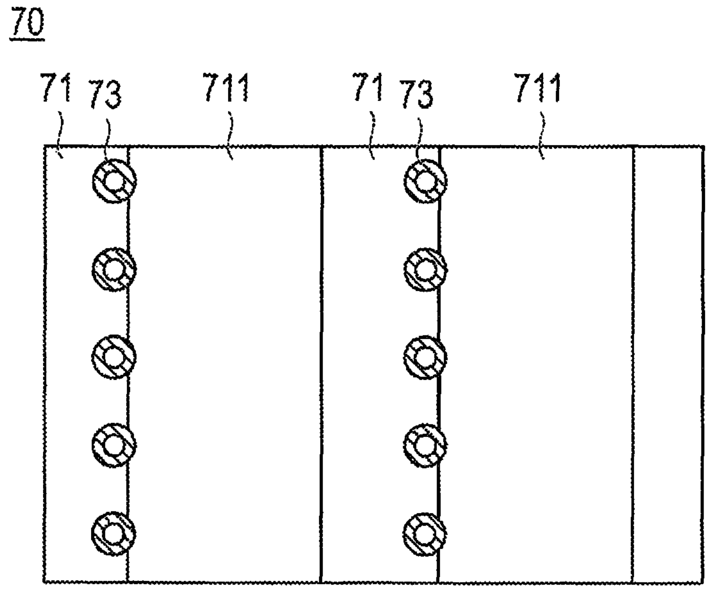
FIG. 10 is a cross-sectional view of the concentration adjustment unit as viewed along section line 10-10 in FIG. 9.
Figure 11:
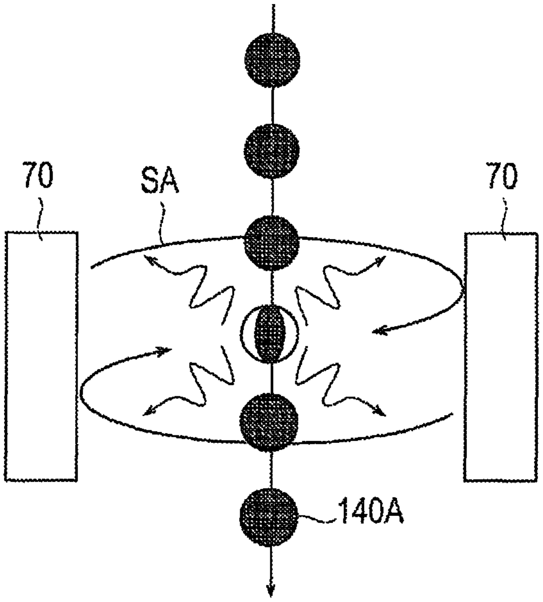
FIG. 11 is a view for explaining the effect of the concentration adjustment unit according to Modified Example 2.

The configuration of the concentration adjustment unit 70 according to Modified Example 2 will be described with reference to FIGS. 9-11. FIG. 9 is a view illustrating the concentration adjustment unit 70 according to Modified Example 2 as seen from the dripping direction of the catalyst ink 140A (corresponding to a view seen from the bottom to the top in FIG. 1). FIG. 10 is a cross-sectional view along line 10-10 of FIG. 9. FIG. 11 is a view for explaining the effect of the concentration adjustment unit 70 according to Modified Example 2.

The concentration adjustment unit 70 according to Modified Example 2 dries the catalyst ink 140A by moving air in the periphery of the catalyst ink 140A while airborne. The amount of solvent in the catalyst ink 140A is then adjusted and the porosity of the catalyst ink layer 140B is controlled by drying the catalyst ink 140A. Since the mechanism by which the porosity of the catalyst ink layer 140B is controlled through the adjustment of the amount of solvent in the catalyst ink 140A is the same as the mechanism described in the first embodiment, a description thereof is omitted here.

The concentration adjustment unit 70 according to Modified Example 2 comprises a first drying promoting plate 71, and a second drying promoting plate 72 provided facing the first drying promoting plate 71, as illustrated in FIGS. 9 and 10. In addition, the concentration adjustment unit 70 comprises a first air supply unit 73 attached to the first drying promoting plate 71, and a second air supply unit 74 attached to the second drying promoting plate 72.

The first drying promoting plate 71 comprises a semicircular recess 711, and the second drying promoting plate 72 comprises a semicircular recess 721. The catalyst ink 140A in drop form flies through the recesses 711, 721.

The first drying promoting plate 71 and the second drying promoting plate 72 are disposed so as to be slightly misaligned in the left-right direction, as illustrated in FIG. 9. Through such an arrangement, it is possible to prevent the air that is supplied from the first air supply unit 73 and the second air supply unit 74 from interfering with the drying promoting plates 71, 72. Then, as illustrated by the arrow in FIG. 9, spiraling air (referred to as swirl air) SA is generated along the recesses 711, 721.

Five first air supply units 73 are provided along the dripping direction (vertical direction in FIG. 10), and two are provided in the left-right direction of FIG. 9, as illustrated in FIG. 10. The number of first air supply units 73 to be provided is not particularly limited. The air supplied from the first air supply unit 73 is preferably warm air, from the standpoint of promoting drying. The number of second air supply units 74 to be provided is preferably the same as the number of first air supply units 73 to be provided.

According to a concentration adjustment unit 70 configured in this manner, swirl air SA is generated along the recesses 711, 721, as illustrated in FIGS. 9, 11. A vortex is generated on the outer perimeter of the catalyst ink 140A in drop form by this swirl air SA, and drying is promoted from the outer perimeter of the catalyst ink 140A in drop form.

In addition, according to this concentration adjustment unit 70, since air is circulated on the outer perimeter of the catalyst ink 140A in drop form, it is possible to promote drying of the catalyst ink 140A in drop form, without affecting the discharge speed of the catalyst ink 140A.

In Modified Example 2, the amount of the catalyst ink 140A to be dried is adjusted according to the number of the first air supply units 73 and second air supply units 74, and the temperature of the air supplied from the first air supply units 73 and the second air supply units 74.

As described above, in the method of producing a membrane catalyst layer assembly 100 provided with the concentration adjustment unit 70 according to Modified Example 2, the catalyst ink 140A is dried by moving air in the periphery of the catalyst ink 140A while airborne. Thus, it is possible to easily control the porosity of the catalyst ink layer 140B. Additionally, since it is possible to promote drying of the catalyst ink 140A without affecting the discharge speed of the catalyst ink 140A, it is possible to produce a high-precision membrane catalyst layer assembly 100.

Modified Example 3

Figure 12:
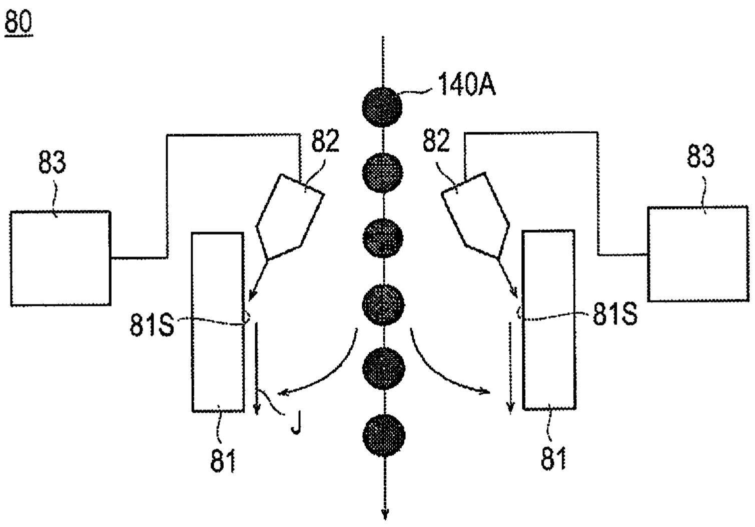
FIG. 12 is a view illustrating a concentration adjustment unit according to Modified Example 3.
Figure 13:
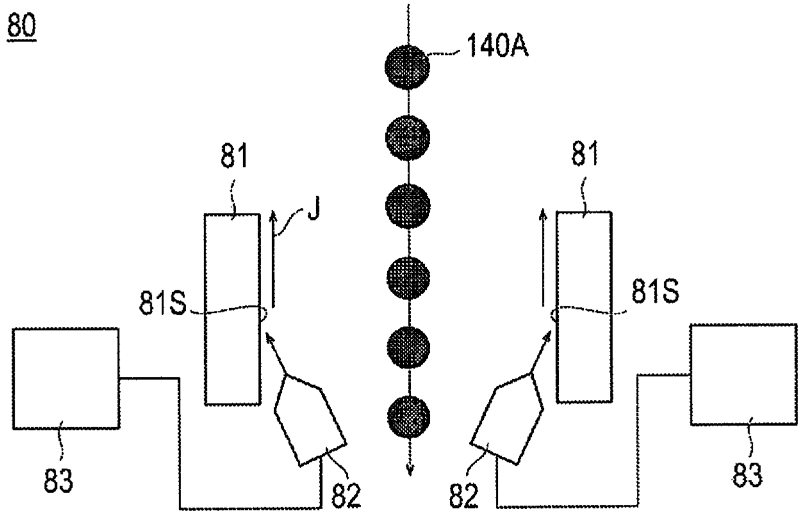
FIG. 13 is a view illustrating a modified example of the concentration adjustment unit according to Modified Example 3.
Figure 14:
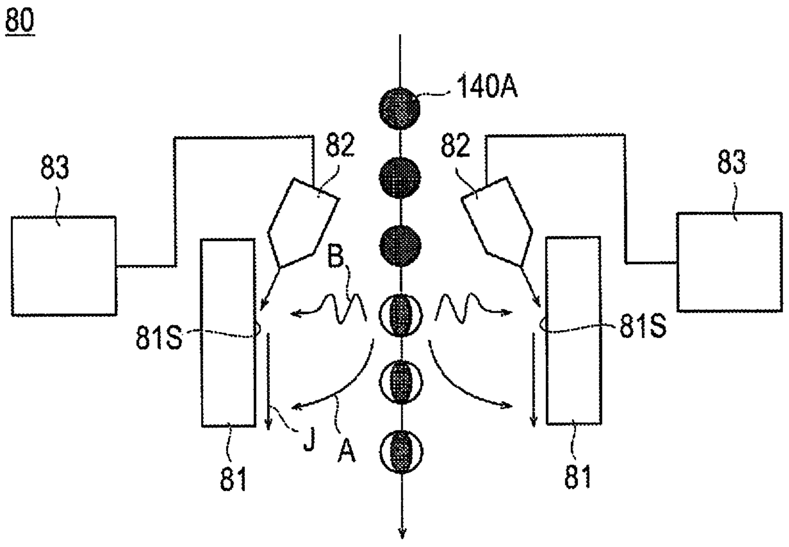
FIG. 14 is a view for explaining the effect of the concentration adjustment unit according to Modified Example 3.

The configuration of the concentration adjustment unit 80 according to Modified Example 3 will be described with reference to FIGS. 12-14. FIG. 12 is a view illustrating the concentration adjustment unit 80 according to Modified Example 3. FIG. 13 is a view illustrating a modified example of the concentration adjustment unit 80 according to Modified Example 3. FIG. 14 is a view for explaining the effect of the concentration adjustment unit 80 according to Modified Example 3.

The concentration adjustment unit 80 according to Modified Example 3 dries the catalyst ink 140A by moving air in the periphery of the catalyst ink 140A while airborne, in the same manner as the concentration adjustment unit 70 according to Modified Example 2. The amount of solvent in the catalyst ink 140A is then adjusted and the porosity of the catalyst ink layer 140B is controlled by drying the catalyst ink 140A.

The concentration adjustment unit 80 according to Modified Example 3 comprises a pair of drying promoting plates 81, as illustrated in FIG. 12. In addition, the concentration adjustment unit 80 comprises injection nozzles 82 that supply air to side surfaces 81S of the drying promoting plates 81, on the sides where the droplets of the catalyst ink 140A pass, in the dripping direction (direction from the top to the bottom in FIG. 12). In addition, the concentration adjustment unit 80 comprises compressors 83 for injecting air from the injection nozzles 82.

The pair of drying promoting plates 81 are provided so as to face each other.

The injection nozzles 82 inject air toward the side surfaces 81S of the drying promoting plates 81 from the upper side toward the lower side in FIG. 12.

The direction in which the air of the injection nozzles 82 is injected may be from the lower side to the upper side, as illustrated in FIG. 13.

According to the concentration adjustment unit 80 configured in this manner, air is injected from the injection nozzles 82 to the drying promoting plates 81 to generate a jet flow J in the vicinity of side surfaces 81S, to thereby draw the air in the periphery of the catalyst ink 140A in drop form downward, as illustrated in FIG. 14 (refer to arrow A). As a result, drying is promoted from the outer perimeter portion of the catalyst ink 140A (refer to arrow B).

In addition, according to this concentration adjustment unit 80, since air does not directly inject the catalyst ink 140A in drop form, it is possible to promote the drying of the catalyst ink 140A in drop form without affecting the discharge speed of the catalyst ink 140A. Therefore, it is possible to produce a high-precision membrane catalyst layer assembly 100.

Second Embodiment

The device 2 and method for producing the membrane catalyst layer assembly 200 according to the second embodiment will now be described.

Figure 15:
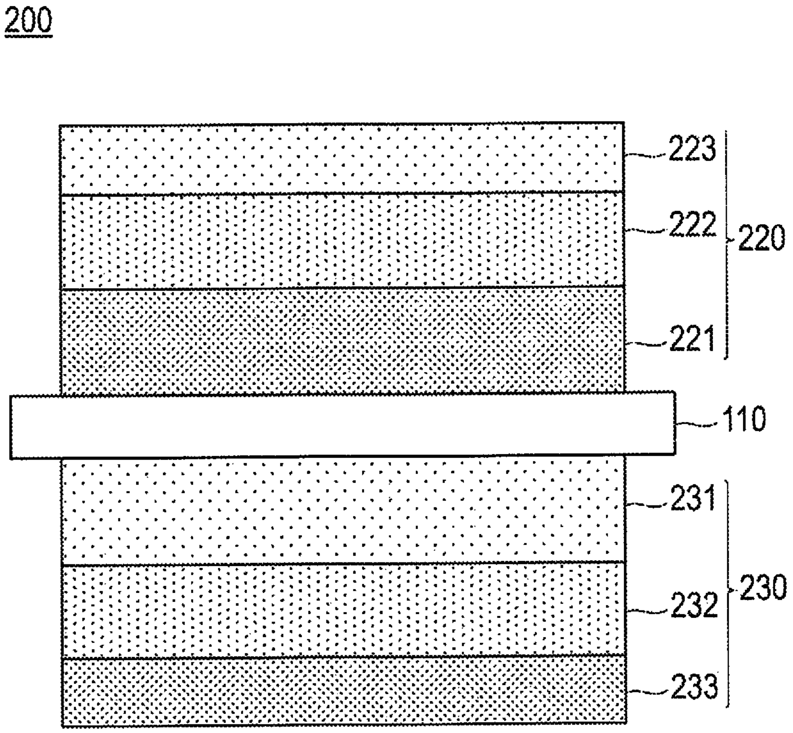
FIG. 15 is a schematic view illustrating the membrane catalyst layer assembly according to the second embodiment.
Figure 16:
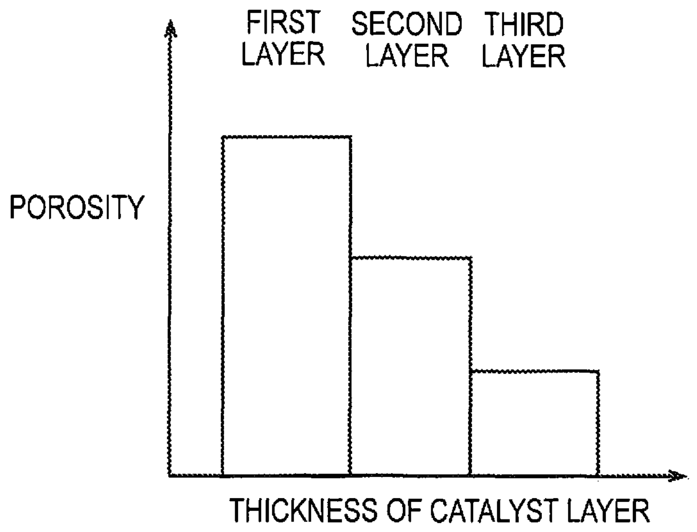
FIG. 16 is a graph illustrating the relationship between the porosity and the thickness of the cathode side catalyst layer.
Figure 17:
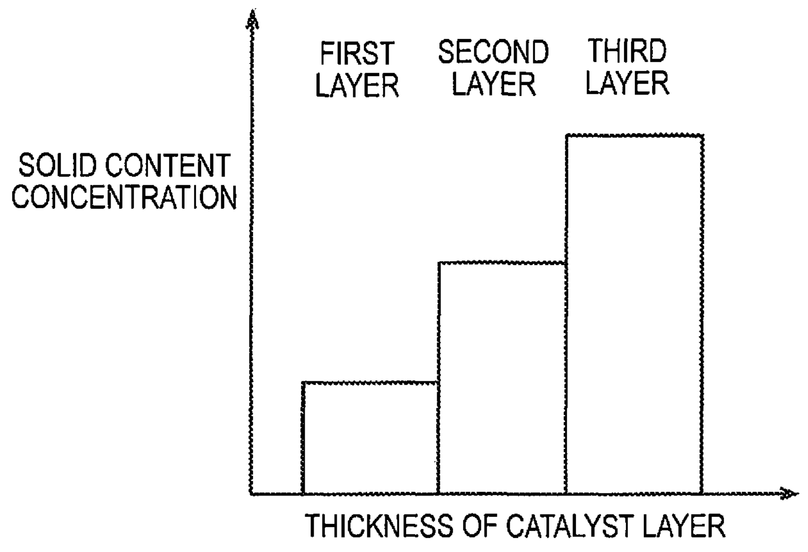
FIG. 17 is a graph illustrating the relationship between the solid content concentration and the thickness of the cathode side catalyst layer.

First, the membrane catalyst layer assembly 200 according to the second embodiment will be described with reference to FIGS. 15-17. FIG. 15 is a view illustrating the membrane catalyst layer assembly 200 according to the second embodiment. FIG. 16 is a graph illustrating the relationship between the porosity and the thickness of the cathode side catalyst layer 220. FIG. 17 is a graph illustrating the relationship between the solid content concentration and the thickness of the cathode side catalyst layer 220.

The membrane catalyst layer assembly 200 according to the second embodiment comprises an electrolyte membrane 110, a cathode side catalyst layer 220 formed on one surface of the electrolyte membrane 110, and an anode side catalyst layer 230 formed on the other surface of the electrolyte membrane 110, as illustrated in FIG. 15.

The cathode side catalyst layer 220 comprises a first layer 221, a second layer 222, and a third layer 223. In the cathode side catalyst layer 220, the first layer 221 is formed with the greatest porosity, and the third layer 223 is formed with the least porosity, as illustrated in FIG. 16. In addition, in the cathode side catalyst layer 220, the first layer 221 is formed with the lowest solid content concentration, and the third layer 223 is formed with the highest solid content concentration, as illustrated in FIG. 17.

According to the cathode side catalyst layer 220 configured in this manner, since the porosity of the first layer 221 is high, it is possible to improve the drainage of water generated by the cathode reaction. Furthermore, since the porosity of the first layer 221 is high, it is possible to reduce the pressure kiss in the first layer 221, and to favorably supply oxygen gas necessary for the cathode reaction to the electrolyte membrane 110.

The anode side catalyst layer 230 comprises a first layer 231, a second layer 232, and a third layer 233. In the anode side catalyst layer 230, the first layer 231 is formed with the least porosity, and the third layer 233 is formed with the greatest porosity. In addition, in the anode side catalyst layer 230, the first layer 231 is formed with the highest solid content concentration, and the third layer 233 is formed with the lowest solid content concentration.

According to the anode side catalyst layer 230 configured in this manner, since the porosity of the third layer 233 is high, it is possible to improve the supply property of water to the electrolyte membrane 110.

From the standpoint of improving the supply property of hydrogen gas, it is preferable to increase the porosity of the first layer 231, in the same manner as the cathode side catalyst layer 220.

Figure 18:
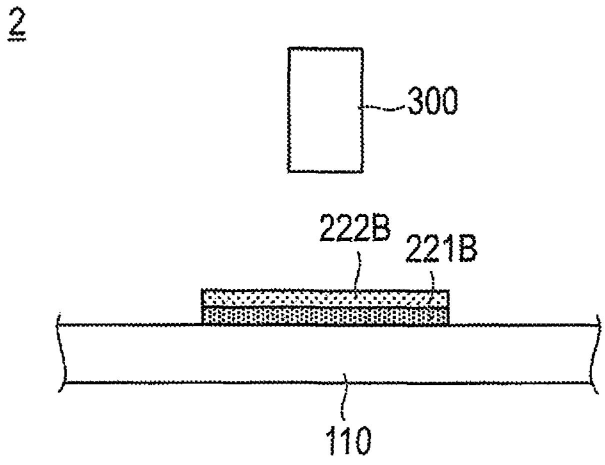
FIG. 18 is a schematic view illustrating the membrane catalyst layer assembly production device according to the second embodiment.

The production device 2 for the membrane catalyst layer assembly 200 according to the second embodiment will now be described with reference to FIG. 18. FIG. 18 is a schematic view illustrating the membrane catalyst layer assembly production device 2 according to the second embodiment.

The production device 2 of the membrane catalyst layer assembly 200 according to the second embodiment comprises an ink tank 10, an ejection unit 20, an adjustment unit 30, and a control unit 15, in the same manner as the production device 1 for the membrane catalyst layer assembly 100 according to the first embodiment. For the sake of clarity, these configurations have been omitted in FIG. 18. The production device 2 for the membrane catalyst layer assembly 200 according to the second embodiment further comprises a detection unit 300 for detecting surface shape irregularities of the first catalyst ink layer 221B, as illustrated in FIG. 18.

The detection unit 300 is, for example, a laser displacement meter. However, the detection unit 300 is not particularly limited as long as a function to detect surface shape irregularities is provided thereto. The surface shape irregularities data of the first catalyst ink layer 221B detected by the detection unit 300 are transmitted to the control unit 15.

Next, the production method for the membrane catalyst layer assembly 200 according to the second embodiment will be described with reference to FIGS. 19 and 20.

Figure 19:
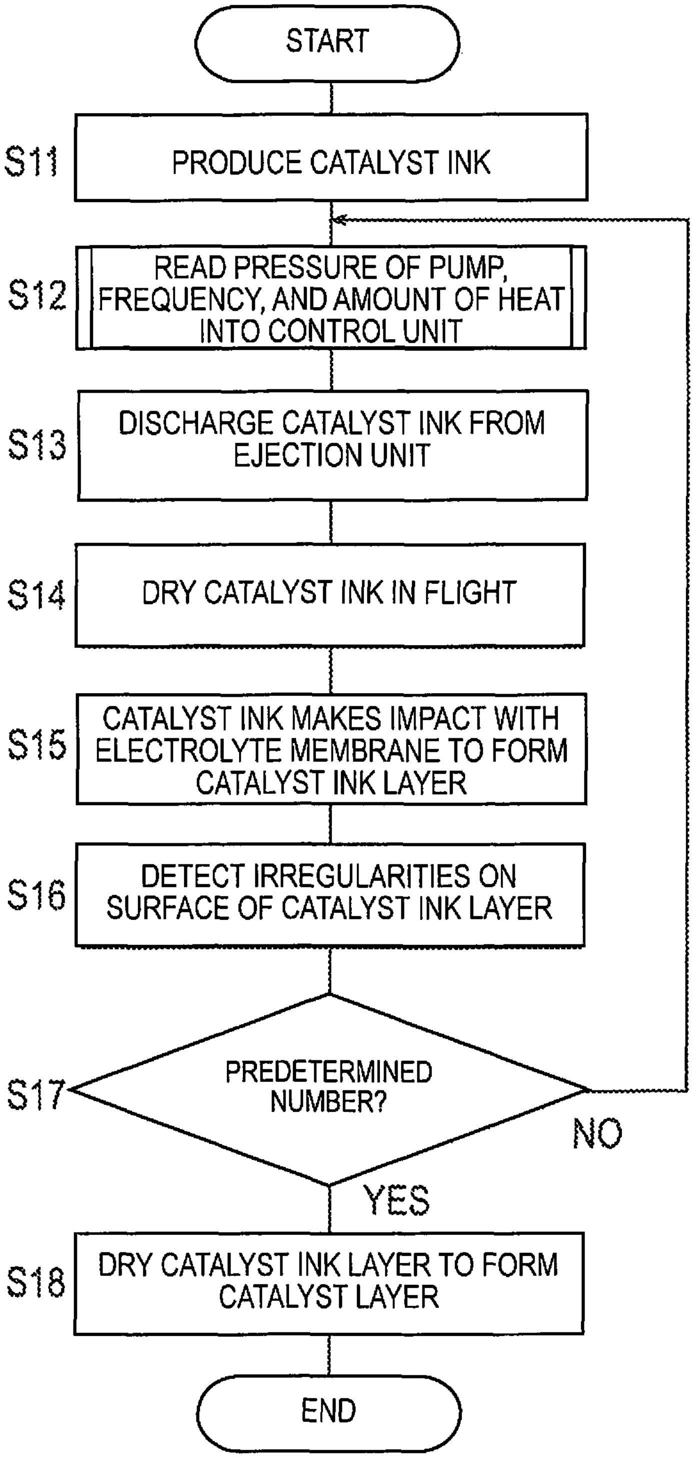
FIG. 19 is a flowchart illustrating the membrane catalyst layer assembly production method according to the second embodiment.
Figure 20:
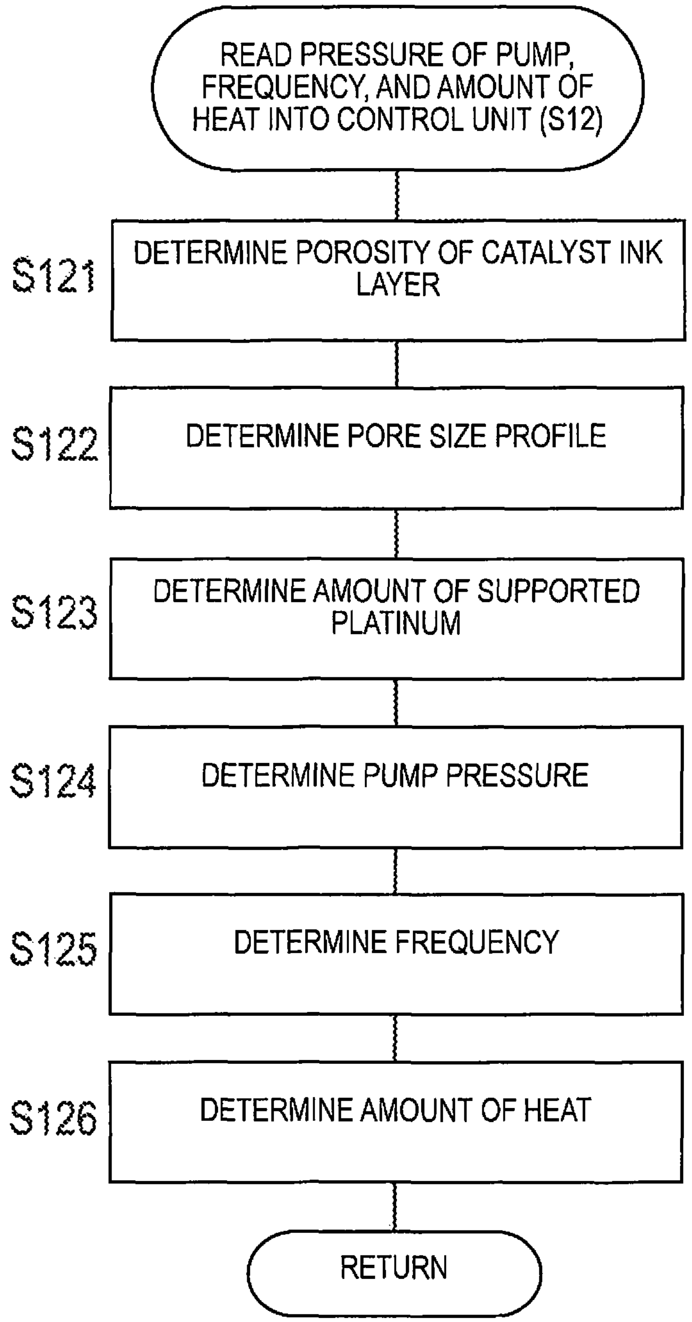
FIG. 20 is a flowchart illustrating Step S12.

FIG. 19 is a flowchart illustrating the production method for the membrane catalyst layer assembly 200 according to the second embodiment. Here, the method of forming the cathode side catalyst layer 220 on the electrolyte membrane 110 will be described. FIG. 20 is a flowchart illustrating Step S12.

In general, in the method of producing the membrane catalyst layer assembly 200 according to the second embodiment, a first catalyst ink layer 221B having a first porosity is formed on the electrolyte membrane 110 by adjusting the amount of solvent in the catalyst ink 140A in drop form prior to impact with the electrolyte membrane 110. Then, by adjusting the amount of solvent in the catalyst ink 140A in drop form prior to impact with the first catalyst ink layer 221B, a second catalyst ink layer 222B having a second porosity, which is different from the first porosity, is formed on the first catalyst ink layer 221B. The first catalyst ink layer 221B forms the first layer 221 of the cathode side catalyst layer 220 by being dried, and the second catalyst ink layer 222B forms the second layer 222 of the cathode side catalyst layer 220 by being dried. The details are described below.

The method of producing the membrane catalyst layer assembly 200 according to the second embodiment is the same as the method of producing the membrane catalyst layer assembly 100 according to the first embodiment up to the point where the catalyst ink 140A makes impact with the electrolyte membrane 110 to form a catalyst ink layer (S11-S15). In Step S12 illustrated in FIG. 20, the pressure of the pump 41, the frequency f of the oscillator 42, and the amount of heat of the concentration adjustment unit 50 are determined such that the first catalyst ink layer 221B will have the first porosity. In addition, in the second embodiment, the catalyst ink layer formed on the electrolyte membrane 110 is referred to as the first catalyst ink layer 221B.

After the first catalyst ink layer 221B is formed on the electrolyte membrane 110, the irregularities of the surface of the first catalyst ink layer 221B are detected by the detection unit 300 (S16).

Next, it is determined whether or not a predetermined number of catalyst ink layers have been formed (S17). In the present embodiment, the cathode side catalyst layer 220 comprises three layers, 221, 222, 223; therefore, it is determined whether or not three catalyst ink layers have been formed.

If it is determined that the predetermined number of catalyst ink layers have not been formed (S17: NO), the process returns to Step S12. Then, the pressure of the pump 41, the frequency f of the oscillator 42, and the amount of heat of the concentration adjustment unit 50 are determined such that the second catalyst ink layer 222B will have the second porosity. It is preferable to control the discharge amount of the catalyst ink 140A forming the second catalyst ink layer 222B such that the surface shape irregularities of the second catalyst ink layer 222B become more moderate relative to the irregularities of the first catalyst ink layer 221B detected in Step S16.

Then the steps described above are repeated until three catalyst ink layers are formed on the electrolyte membrane 110.

Then, if it is determined that the predetermined number of catalyst ink layers have been formed (S17: YES), the cathode side catalyst layer 220 is formed by drying the catalyst ink layers (S18).

Since the method of forming the anode side catalyst layer 230 is substantially the same as the method of forming the cathode side catalyst layer 220, the description thereof is omitted.

With the steps described above, the membrane catalyst layer assembly 200 according to the second embodiment is produced.

As described above, according to the method and production device 2 for the membrane catalyst layer assembly 200 according to the second embodiment, it is possible to provide a membrane catalyst layer assembly 200 comprising a cathode side catalyst layer 220 having different desired porosities in the lamination direction.

In addition, the surface shape irregularities of the first catalyst ink layer 221B are detected. The discharge amount of the catalyst ink 140A forming the second catalyst ink layer 222B is then adjusted such that the surface shape irregularities of the second catalyst ink layer 222B become more moderate relative to the detected irregularities of the first catalyst ink layer 221B. Accordingly, it is possible to further flatten the surface of the cathode side catalyst layer 220 and to suitably arrange the gas diffusion layer.

In addition, as described above, the membrane catalyst layer assembly 200 according to the second invention is a membrane catalyst layer assembly 200 in which a cathode side catalyst layer 220 is formed on one surface of an electrolyte membrane 110 for a fuel cell, and an anode side catalyst layer 230 is formed on the other surface of the electrolyte membrane 110. The cathode side catalyst layer 220 and the anode side catalyst layer 230 are formed by the lamination of a plurality of layers having mutually different porosities. Accordingly, it is possible to provide a membrane catalyst layer assembly 200 comprising catalyst layers 220, 230 having different desired porosities in the lamination direction.

The present invention is not limited to the embodiment described above, and various modifications are possible within the scope of the claims.

In the first embodiment described above, the porosity of the catalyst ink layer 140B is adjusted by the volume adjustment unit 40 and the concentration adjustment unit 50. However, the porosity of the catalyst ink layer 140B may be adjusted by one of the volume adjustment unit 40 and the concentration adjustment unit 50.

In addition, in the first embodiment described above, the volume adjustment unit 40 changes the droplet volume of the catalyst ink 140A by adjusting the frequency f and the flow rate V at the time of discharge of the catalyst ink 140A. However, the droplet volume of the catalyst ink 140A may be changed by adjusting one of the frequency f and the flow rate V at the time of discharge of the catalyst ink 140A.

The invention claimed is:

1. A membrane catalyst layer assembly production method for producing a membrane catalyst layer assembly by discharging droplets of catalyst ink having a solvent and a solid component in column form onto an electrolyte membrane, the membrane catalyst layer assembly production method comprising:

forming a first catalyst ink layer having a first porosity on the electrolyte membrane by discharging the catalyst ink in a dropwise manner in column form and controlling a porosity of the first catalyst ink layer that is formed by the catalyst ink making impact with the electrolyte membrane, the porosity of the first catalyst ink layer being controlled by:

adjusting an amount of solvent in the catalyst ink in drop form prior to impact with the electrolyte membrane by adjusting at least one of: a frequency of vibration of an ejection unit that holds the catalyst ink, and a flow rate of droplets of the catalyst ink at a time of discharging the catalyst ink to change a droplet volume of the catalyst ink; and changing a solid content concentration of the catalyst ink by adjusting a drying of the catalyst ink while airborne; and forming a second catalyst ink layer having a second porosity, which is different from the first porosity, on the first catalyst ink layer, by discharging the catalyst ink in the dropwise manner in column form and adjusting the amount of solvent in the catalyst ink in drop form prior to impact with the first catalyst ink layer by:

adjusting at least one of the frequency of vibration of the ejection unit that holds the catalyst ink and the flow rate of droplets of the catalyst ink at the time of discharging the catalyst ink to change a droplet volume of the catalyst ink; and changing the solid content concentration of the catalyst ink by adjusting the drying of the catalyst ink while airborne using a device disposed between the ejection unit and the electrolyte membrane.

2. The membrane catalyst layer assembly production method as recited in claim 1, wherein the catalyst ink is dried by applying heat to the catalyst ink while airborne.

3. The membrane catalyst layer assembly production method as recited in claim 1, wherein the catalyst ink is dried by moving air in a periphery of the catalyst ink while airborne in a discharge direction of the catalyst ink, or in a circumferential direction along the discharge direction.

4. The membrane catalyst layer assembly production method as recited in claim 1, comprising detecting surface shape irregularities of the first catalyst ink layer, and adjusting a discharge amount of the catalyst ink forming the second catalyst ink layer such that the surface shape irregularities of the second catalyst ink layer become more moderate relative to detected irregularities of the first catalyst ink layer.

5. The membrane catalyst layer assembly production method as recited in claim 1, wherein the catalyst ink is further dried after the second catalyst ink layer has been coated on the electrolyte membrane.

6. A membrane catalyst layer assembly production device for producing a membrane catalyst layer assembly by discharging droplets of catalyst ink having a solvent and a solid component onto an electrolyte membrane in column form, the membrane catalyst layer assembly production device comprising:

an adjustment unit that controls a porosity of a catalyst ink layer that is formed by the catalyst ink making impact with the electrolyte membrane by adjusting an amount of the solvent in the catalyst ink in drop form prior to impact with the electrolyte membrane; and a control unit that controls the adjustment unit, the adjustment unit comprising a volume adjustment unit that adjusts an amount of solvent in the catalyst ink by adjusting at least one of a frequency of vibration of an ejection unit that holds the catalyst ink and a flow rate of droplets of the catalyst ink from the ejection unit at a time of discharging the catalyst ink in a dropwise manner in column form to change a droplet volume of the catalyst ink, and the control unit being configured to:

cause a first catalyst ink layer having a first porosity to be formed on the electrolyte membrane by discharging the catalyst ink in the dropwise manner in column form and adjusting the amount of solvent in the catalyst ink in drop form prior to impact with the electrolyte membrane, and cause a second catalyst ink layer having a second porosity, which is different from the first porosity, to be formed on the first catalyst ink layer, by discharging the catalyst ink in the dropwise manner in column form and adjusting the amount of solvent in the catalyst ink in drop form prior to impact with the first catalyst ink layer, wherein the adjustment unit comprises a concentration adjustment unit that changes a solid content concentration of the catalyst ink by adjusting a drying of the catalyst ink while airborne, the concentration adjustment unit being disposed downstream of the ejection unit with respect to a discharge direction of the catalyst ink.

7. The membrane catalyst layer assembly production device as recited in claim 6, wherein the concentration adjustment unit dries the catalyst ink by applying heat to the catalyst ink while airborne.

8. The membrane catalyst layer assembly production device as recited in claim 6, wherein the concentration adjustment unit dries the catalyst ink by moving air in a periphery of the catalyst ink while airborne in the discharge direction of the catalyst ink, or in a circumferential direction along the discharge direction.

9. The membrane catalyst layer assembly production device as recited in claim 6, further comprising a detection unit for detecting surface shape irregularities of the first catalyst ink layer, the control unit being configured to adjust a discharge amount of the catalyst ink forming the second catalyst ink layer such that the surface shape irregularities of the second catalyst ink layer become more moderate relative to the irregularities of the first catalyst ink layer detected by the detection unit.

10. The membrane catalyst layer assembly production device as recited in claim 6, further comprising a device configured to further dry the catalyst ink after the second catalyst ink layer has been coated on the electrolyte membrane.

11. A membrane catalyst layer assembly production method for producing a membrane catalyst layer assembly by discharging droplets of catalyst ink having a solvent and a solid component in column form onto an electrolyte membrane, the membrane catalyst layer assembly production method comprising:

forming a first catalyst ink layer having a first porosity on the electrolyte membrane by controlling a porosity of a catalyst ink layer that is formed by the catalyst ink making impact with the electrolyte membrane by discharging the catalyst ink in a dropwise manner in column form from an ejection unit, changing a solid content concentration of the catalyst ink by adjusting an amount of solvent in the catalyst ink, and drying the catalyst ink by moving air in a periphery of droplets of the catalyst ink while airborne prior to impact with the electrolyte membrane in a discharge direction of the catalyst ink or in a circumferential direction along the discharge direction using a device disposed between the ejection unit and the electrolyte membrane, and forming a second catalyst ink layer having a second porosity, which is different from the first porosity, on the first catalyst ink layer, by discharging the catalyst ink in the dropwise manner in column form from the ejection unit, changing the solid content concentration of the catalyst ink by adjusting the amount of solvent in the catalyst ink, and drying the catalyst ink by moving air in the periphery of droplets of the catalyst ink while airborne prior to making impact with the first catalyst ink layer in a discharge direction of the catalyst ink or in a circumferential direction along the discharge direction using the device disposed between the ejection unit and the electrolyte membrane.

12. The membrane catalyst layer assembly production method as recited in claim 11, wherein the catalyst ink is discharged by an inkjet method, and the amount of solvent in the catalyst ink is adjusted by adjusting at least one of a frequency of vibration of an ejection unit that holds the catalyst ink and a flow rate of droplets of the catalyst ink at the time of discharging the catalyst ink in the dropwise manner to change a droplet volume of the catalyst ink.

13. The membrane catalyst layer assembly production method as recited in claim 11, comprising detecting surface shape irregularities of the first catalyst ink layer, and adjusting a discharge amount of the catalyst ink forming the second catalyst ink layer such that the surface shape irregularities of the second catalyst ink layer become more moderate relative to detected irregularities of the first catalyst ink layer.

14. The membrane catalyst layer assembly production method as recited in claim 11, wherein the catalyst ink is further dried after the second catalyst ink layer has been coated on the electrolyte membrane.

15. A membrane catalyst layer assembly production device for producing a membrane catalyst layer assembly by discharging droplets of catalyst ink comprising a solvent and a solid component in column form onto an electrolyte membrane, the membrane catalyst layer assembly production device comprising:

an adjustment unit that controls a porosity of a catalyst ink layer that is formed by the catalyst ink making impact with the electrolyte membrane by adjusting an amount of solvent in the catalyst ink discharged from an ejection unit in drop form prior to impact with the electrolyte membrane; and a control unit that controls the adjustment unit, the adjustment unit comprising a concentration adjustment unit that changes a solid content concentration of the catalyst ink, by adjusting the amount of solvent in the catalyst ink, and dries the catalyst ink, by moving air in the periphery the catalyst ink while airborne in a discharge direction of the catalyst ink or in a circumferential direction along the discharge direction, and the control unit being configured to:

cause a first catalyst ink layer having a first porosity to be formed on the electrolyte membrane by discharging the catalyst ink in a dropwise manner in column form and adjusting the amount of solvent in the catalyst ink in drop form prior to impact with the electrolyte membrane, and cause a second catalyst ink layer having a second porosity, which is different from the first porosity, to be formed on the first catalyst ink layer by discharging the catalyst ink in the dropwise manner in column form and adjusting the amount of solvent in the catalyst ink in drop form prior to impact with the first catalyst ink layer, the concentration adjustment unit being disposed downstream of the ejection unit with respect to the discharge direction of the catalyst ink.

16. The membrane catalyst layer assembly production device as recited in claim 15, wherein the catalyst ink is discharged by an inkjet method, and the adjustment unit comprises a volume adjustment unit that adjusts the amount of solvent in the catalyst ink by adjusting at least one of a frequency of vibration of an ejection unit that holds the catalyst ink and a flow rate of droplets of the catalyst ink at a time of discharging the catalyst ink in the dropwise manner to change a droplet volume of the catalyst ink.

17. The membrane catalyst layer assembly production device as recited in claim 15, further comprising a detection unit for detecting surface shape irregularities of the first catalyst ink layer, the control unit being configured to adjust a discharge amount of the catalyst ink forming the second catalyst ink layer such that the surface shape irregularities of the second catalyst ink layer become more moderate relative to the irregularities of the first catalyst ink layer detected by the detection unit.

18. The membrane catalyst layer assembly production device as recited in claim 15, further comprising a device configured to further dry the catalyst ink after the second catalyst ink layer has been coated on the electrolyte membrane.

* * * * *